United States Patent [19]

Tretiakoff et al.

[11] 4,044,350
[45] Aug. 23, 1977

[54] ELECTROMECHANICAL TRANSDUCER FOR RELIEF DISPLAY PANEL

[76] Inventors: Oleg Tretiakoff; Andrée Tretiakoff, both of 43 avenue Lulli, Sceaux, France, 92330

[21] Appl. No.: 605,853

[22] Filed: Aug. 19, 1975

[30] Foreign Application Priority Data

Aug. 22, 1974 France .................. 74.28793

[51] Int. Cl.² .................................. G09F 9/32
[52] U.S. Cl. ......................... 340/407; 340/336
[58] Field of Search ............... 340/407, 336; 178/DIG. 32; 310/8.3, 8.5, 8.7

[56] References Cited

U.S. PATENT DOCUMENTS

| 3,395,247 | 7/1968 | Fieldgate | 340/407 |
| 3,588,552 | 6/1971 | Schafft | 310/8.7 |
| 3,697,790 | 10/1972 | Flint et al. | 310/8.7 |

OTHER PUBLICATIONS

*Manual Tactile Converter,* Schaaf; IBM Tech. Discl. Bull., vol. 17, No. 8, pp. 2208-2209; Jan. 1975.

*Primary Examiner*—Marshall M. Curtis
*Attorney, Agent, or Firm*—Edwin E. Greigg

[57] ABSTRACT

A reading plate has an array of holes in its surface. Rounded ends of rods project selectively through these holes by the action of a set of bimorphous piezoelectric reeds, on which they rest perpendicularly. Each reed is connected to a source of electric voltage which can assume two distinct values as a function of an electrical control signal in order to make the piezoelectric reeds bend in one direction or the other. The reading rods are distributed in groups of six and arranged in each group according to the conventional arrangement of dots of a braille character. The transducer can thus provide a relief read-out panel for a pocket electronic calculator for the blind.

20 Claims, 8 Drawing Figures

ELECTROMECHANICAL TRANSDUCER FOR RELIEF DISPLAY PANEL

The present invention relates to devices enabling the production of electronic pocket calculators for the blind and in particular to an electromechanical transducer device for producing relief display panels.

Electronic pocket calculators could be of immense service to the blind who encounter the greatest difficulty in making numerical calculations, especially when these calculations require the use of magnitudes which must be sought in tables (for example logarithms, trigonometric functions, etc.).

Such calculators are at present useless to blind persons since the results are presented in the form of a visual image of luminous figures in a window.

The method of writing and reading currently employed by the blind throughout the world is the braille system. In this system each sign (letter, figure or sign of punctuation) is represented by a geometric figure constituted of points in relief to a maximum number of six. These geometric figures are easily recognized to the touch by the blind who can, with training, read very rapidly. Unfortunately, braille books are bulky and expensive to produce, which limits the access of blind people to written information. To overcome these drawbacks and to produce texts in relief from electrical signals, electromechanical methods are known enabling the production of braille characters in relief. The known methods have all numerous drawbacks: mechanical complexity, bulk, weight, noise, high consumption of electricity.

More recently, it has been proposed to use vibrating points with piezoelectric actuation to constitute characters intended to be read by touch (U.S. Pat. No. 3,229,387). This device has still serious drawbacks. Firstly, the majority of blind people find their sense of touch fatigued and even irritated by the vibrations. Further, they are obliged to adapt themselves to a mode of reading which is very different from that of books in relief: instead of drawing the finger over a line of characters in relief, thereby being able to slow down, accelerate, stop, or back-track at will, they must — by reason of the fragility of the vibrating points — leave the finger immobile on the vibrating points, the latter then successively presenting the characters of the text. Lastly, the vibrating points emit a distinctly audible sound, which then constitutes a nuisance in the vicinity, particularly if several persons work close together.

It is an object of the present invention to provide a display device presenting to the blind person, lines of characters in relief with characteristics identical to those that they are accustomed to encounter in braille books of the best quality Another object of this invention is to provide a relief display device which is light and of little bulk.

Another object of this invention is to provide a silent relief display device.

Another object of this invention is to provide a relief display device consuming very little electrical energy.

Another object of this invention is to provide a relief display device which is robust and capable of withstanding any false manoeuver of the user.

Another object of this invention is to provide a modular relief display device, that is to say constituted of identical modular elements which can be juxtaposed so as to obtain lines of characters of the desired length.

Yet another object of this invention is to provide an entirely dismountable relief display device to facilitate maintenance or replacement of the elements constituting the device.

These and other objects of this invention may be achieved by means of an electromechanical transducer device comprising: a bimorphous piezoelectric reed bendable longitudinally on the application of a DC voltage; coupling means supported on said reed; a rod arranged transversely to said piezoelectric reed and coupled to said coupling means; whereby on the application of said voltage the bending movement of the reed is translated into longitudinal axial static displacement of said rod.

According to the invention a panel for forming a relief image comprises: a tactually scannable plate having a plurality of holes therethrough arranged in an array; a plurality of rods having corresponding ends traversing slidably said holes; a plurality of bimorphous piezoelectric reeds arranged on one side of said plate; means for supporting the ends of said reeds and means for electrical connection to the electrodes of said reeds; rod-coupling means supported on each said reed and coupling each rod to a respective one of said piezoelectric reeds; each rod being thereby movable along its longitudinal axis between a first static position in which its said end projects a tactually detectable distance from its hole and a second static position in which its said end does not project from its hole, by the application of a DC voltage to its respective reed.

In an electronic calculator constructed according to the present invention, the results can be presented in the form of braille figures in relief, appearing in a window similar to that of ordinary pocket calculators. In these calculators, the actuating key-board can include several tens of keys each for actuating a different operation: entry of a figure into the calculator, addition, subtraction, multiplication, division, root extraction, etc...

In a calculator according to the present invention, each of the possible operations is actuated by composing a braille character by means of a seven-key keyboard similar to that of a braille typewriter.

The invention will be better understood on reading the description which follows, in conjunction with the accompanying drawings, of a specific embodiment of the invention, which is in no way to be regarded as limiting.

The general arrangement of the elements composing an electronic calculator according to the present invention will first be described.

Figure 1:
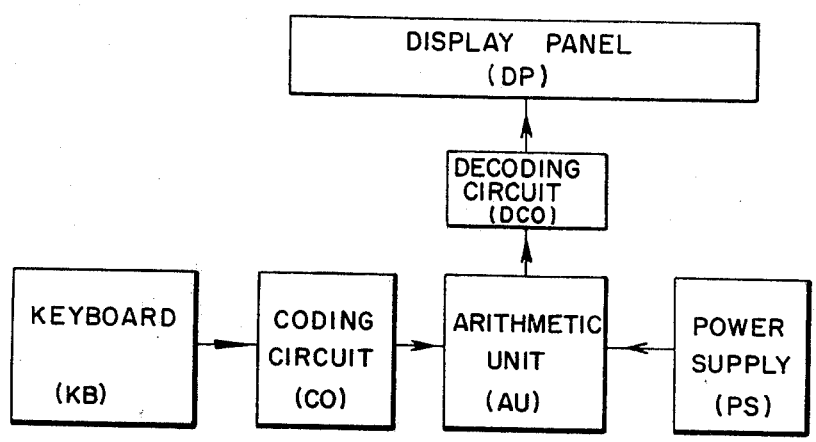
FIG. 1 is a block diagram of an embodiment of an electronic calculator according to the invention.

This arrangement will be better understood by referring to the diagram of FIG. 1.

The "heart" of a calculator is constituted by the arithmetic unit AU capable of carrying out all the desired operations. This arithmetic unit is a current model used in commercial pocket electronic calculators. The possibilities of the calculator will be all the greater as a more improved arithmetic unit is used.

By pressing on one or several keys of the keyboard (KB) the braille character corresponding to the selected operation is composed.

The electronic coding circuit CO converts this character into a number corresponding to the operation selected in the input code of the arithmetic unit AU. The result of the operation supplied by the arithmetic unit AU in its output code, is converted into braille by the decoding circuit DCO, which actuates the appearance of the braille figures in relief on the display panel for the results DP.

The power supply PS is of a type currently used in commercial pocket calculators.

Figure 2:
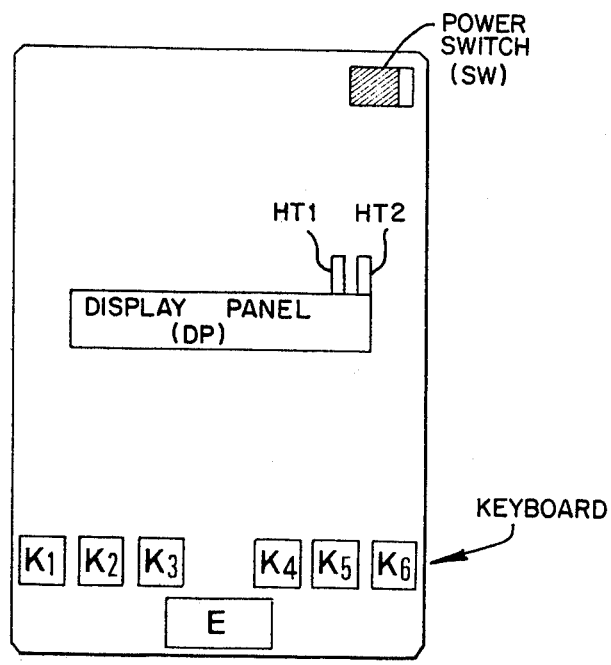
FIG. 2 is a plan view of the control panel of an electronic calculator according to the invention.

An electric calculator according to the present invention, is in the form of a rectangular box of small thickness, whoseupper surface comprises the display panel for the results DP, the actuating keyboard comprising the seven keys K1 to K6 and E and the on-off switch SW. FIG. 2 indicates by way of non-limiting example, a suitable arrangement of these elements.

The elements constituting an electronic calculator according to the present invention, will now be described in detailed manner.

KEYBOARD KB

The six keys K1 to K6 enable the composition of 63 different characters and consequently the actuation of as many different operations of the calculator. These possibilities are greater than those of the actuating keyboard of commercial pocket electronic calculators generally comprising from 20 to 40 keys.

The key E is reserved for the zero reset of the calculator.

CODING CIRCUIT CO

This circuit is for converting the instructions in braille code from the keyboard KB into instructions in the input code of the arithmetic unit.

Figure 3:
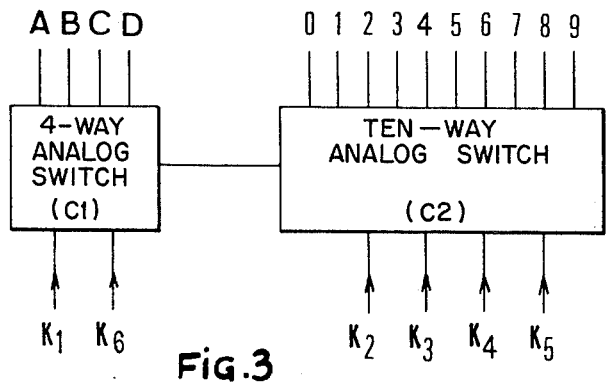
FIG. 3 is a schematic diagram of a coding circuit for an embodiment of an electronic calculator according to the invention.

Such a circuit is shown, by way of non-limiting example, in FIG. 3. The microelectronic components used are currently available in the trade.

This circuit includes a 4-way analog switch C1 actuated by the keys K1 and K6 connected to a ten-way analog switch C2 actuated by the keys K2, K3, K4, and K5.

This arrangement is used when the input code of the arithmetic unit is decimal. The lines A,B,C,D selected by C1 corresponds to the tens, the lines 0,1,2,3,4,5,6,7,8,9 selected by C2 correspond to the units. The arithmetic unit can thus be given 40 different orders in decimal code, by composing by means of the six keys K one of the 40 first braille characters.

The ten first braille characters will correspond for example to the input into the calculator of the figures from 0 to 9, the 10 following characters to 10 operations such as addition, subtraction, multiplication, division, etc., the 10 following characters to the computation order of an operation such as inversion, square, square root, etc. and so on.

DECODING CIRCUIT DCO

Figure 4:
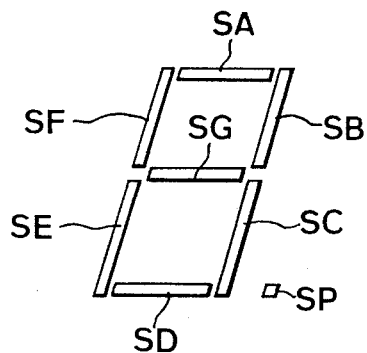
FIG. 4 is a simplified diagram of a conventional visual display element of a pocket electronic calculator.

In commercial pocket electronic calculators, the figures of the display panel of the results are generally constituted by light-emitting diodes or liquid crystals comprising 7 rectilinear segments and a decimal point according to the arrangement of FIG. 4.

To obtain the desired figure it suffices to illuminate the appropriate segments. The Fig. 1, for example, is obtained by illuminating the segments SB and SC, the FIG. 3 by illuminating the segments SA,SB,SC,SD,SG, the minus sign (−) by illuminating the segment SG, etc.

The arithmetic units available in the trade are designed for this type of display and hence supply the results in the corresponding eight-line code. In an electronic calculator according to the present invention, the decoding circuit is responsible for converting the results into the braille code. A code converter of this type can be, for example, constructed with a read-only memory of 64 × 6 bits.

DISPLAY PANEL DP

Figure 5:
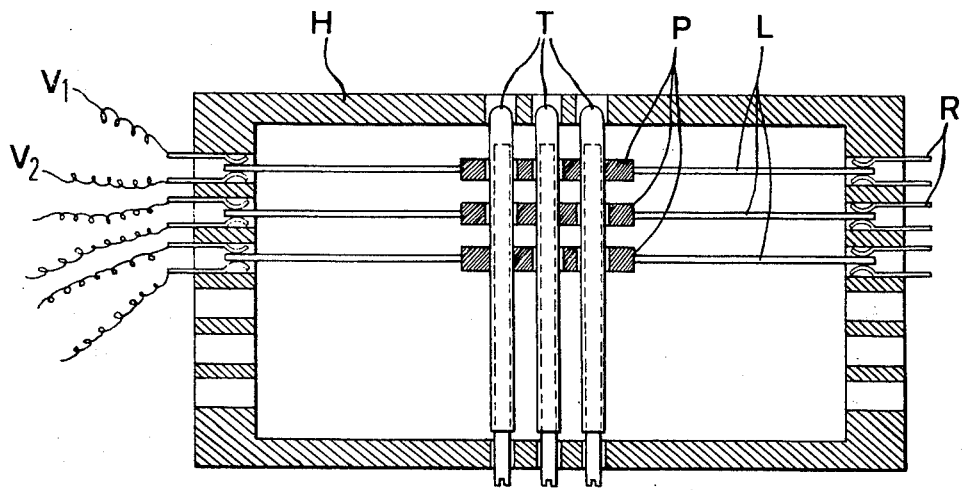
FIG. 5 is a simplified vertical cross-section of an embodiment of an electromechanical transducer for a display device according to the invention.

Each braille character of the display panel for the results is obtained by means of an electromechanical transducer device according to the present invention of which an embodiment is shown in FIG. 5.

A cylindrical rod T of 1.4 mm diameter can slide vertically in two holes pierced in two horizontal plates of a support housing H of molded plastics material. The upper end of the rod T is of hemispheric shape and polished so as to constitute one braille point in relief easy to detect when the rod T extends beyond the upper surface of the support H by about 0.7 mm.

The rod (T) is fastened in a small block of insulating material P through which it passes perpendicularly, e.g. screwably by a tapping of the block and corresponding threading on the rod at least over the axial length of its passage through the block, with a screwing slot in either end of the rod, enabling adjustment of the projection of the rounded end of the rod above the upper surface of the support H. A thin strip or reed of bimorphous piezoelectric ceramic L rests horizontally in a groove of the block (P) closely adjacent the rod T. This strip is slidably gripped at each of its ends between two metallic springs R held inside housings formed in the vertical pillars of the support of molded plastics material H. Block P is located midway between the ends of strip L. Two of the springs R also serve to ensure the electrical connections between the upper and lower electrodes of the strip L and the two leads at the respective electric potentials $V_1$ and $V_2$ (see FIG. 6).

When $V_1 = V_2$ the piezoelectric strip L is rectilinear and at rest. If $V_1$ is less than $V_2$ the strip L curves in a vertical plane and pushes the block P and hence the rod T vertically upwards. If on the contrary $V_1$ is greater than $V_2$ the strip L curves in the opposite direction and pulls the block P and the rod T vertically downwards.

By using a piezoelectric strip of 70 mm length, 1.7 mm width, and 0.67 mm thickness of lead zirconate-titanate available commercially, a vertical movement of 0.5 mm is obtained for a difference of 250 volts between $V_1$ and $V_2$.

In order to obtain a very distinct retraction or relief of the braille point it is desirable to have an overall travel of the rod T of about 1 mm. Stop means can be provided on the rod to limit excessive bending of the piezoelectric strip which may break it, through external pressure on the end of the rod. These stop means may be constituted by the threading on the rod forming shoulders which can come into abutment with the edges of the holes in the horizontal plates of the housing H. Said travel can be obtained by using the actuating circuit shown in FIG. 6.

This circuit comprises two high-voltage transistors $TR_1$ and $TR_2$, two load resistors $R_1$ and $R_2$ of which a typical value is 22Ω, two resistors in the base circuits of the transistors $R_3$ and $R_4$ of which a typical value is 470 kΩ and a digital inverter I.

Figure 6:
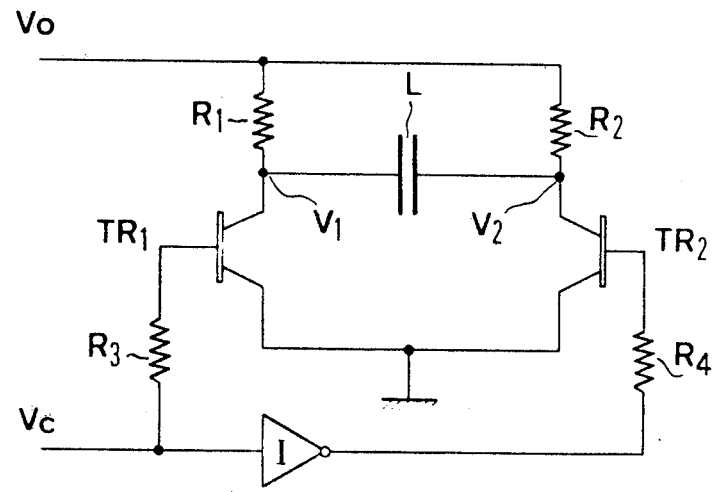
FIG. 6 shows a circuit diagram of an actuating circuit suitable for the embodiment of FIG. 5.

An electrical control voltage $V_c$ is applied at the point indicated in the diagram of FIG. 6. This voltage is supplied by the decoding circuit DCO described previously.

A positive voltage $V_c$ renders the transistor $TR_1$ conductive and blocks the transistor $TR_2$. One then obtains $V_1 = 0$ and $V_2 = 250$ volts for a supply voltage $V_o$ of 250 volts.

A zero voltage $V_c$ produces the reverse result, that is to say $V_1 = 250$ and $V_2 = 0$. The desired vertical travel of 1 mm for the rod (T) is thus obtained.

Two of the principal advantages of the braille point display device according to the present invention are:
1. Very low electrical consumption: about 3mW for the circuit described. This consumption is less than that of a luminous segment.
2. Small size permitting the juxtaposition of as many braille characters as desired whilst respecting the standard dimensions and spacing of braille characters.

Figure 7:
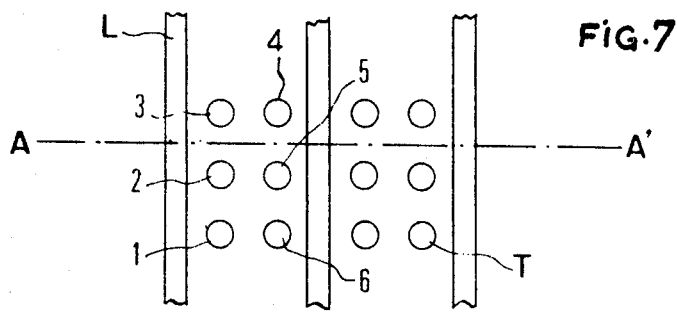
FIG. 7 shows in simplified plan two juxtaposed modules to form two consecutive braille characters from the embodiments of FIG. 5.
Figure 8:
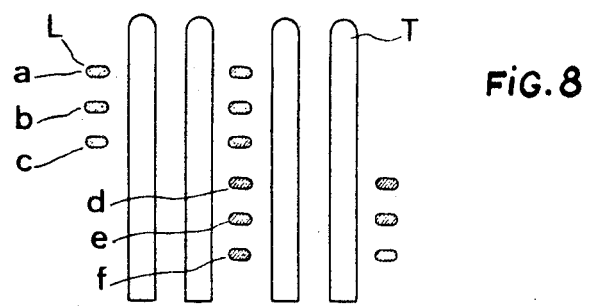
FIG. 8 shows a vertical sectional view along the line AA' of FIG. 7.

According to the present invention, this juxtaposition is produced by arranged 12 piezoelectric strips in 4 sets of three, two of said sets with their respective set of 3 blocks (P) being one above the other in the space available between two consecutive braille characters. Each rod in a set of three is coupled to its respective block only and passes freely through holes in each of the other blocks in the set. This arrangement is shown in FIGS. 7 and 8 which show respectively a plan view and a vertical sectional view along AA' of the group of rods T and of the strips L constituting a group of two consecutive braille characters. For the left-hand character, the strips designated by the letters a,b,c,d,e,f respectively drive the rods designated by the FIGS. 1,2,3,4,5,6.

Up to 12 rods T and the corresponding strips L can be housed in one modular support of molded plastics material as diagrammatically shown in FIGS. 5,7 and 8.

Two adjacent modular supports sandwich a printed circuit board on which the requisite elements are mounted according to the circuit diagram of FIG. 6, for producing the electrical actuation of the movement of each of the twelve rods T in one modular support.

A modular support with a printed circuit board constitutes a module of one half, one complete and one half braille characters. The dimensions of such a module are typically 12 mm in width, 40 mm in height, and 140 mm in length. A display panel with 2N braille characters is produced by juxtaposing N modules. Thus the braille read-out panel can conveniently have a line of seven such modules sandwiching six printed circuit boards. The last module may carry also two short horizontal metal tablets (HTI), (HT2) – placed laterally to the line of braille as shown in FIG. 2 – forming an electrical switch for triggering or changing the braille display when contacted by the finger or for memory transfer. These tablets are connected to the electrical circuit in manner known in itself.

A braille read-out panel according to the present invention places at the disposal of the blind the immense present and future possibilities of electronic pocket calculators whilst preserving all their advantages: small bulk, lightness, silent operation, several hours of autonomous operation by means of incorporated batteries. This applies naturally to office electronic calculators or to large electronic calculators.

Besides its use in electronic calculators, a braille read-out panel according to the present invention may be incorporated in other reading and recording equipment intended for the blind, e.g. for recording and read-out of magnetic tape or punched tape, especially a portable "minicassette" player. The device could also be used in equipment for controlling machines and transmission of data or of orders to a distance, where monitoring in braille or the like can replace visual monitoring.

The device according to the invention could obviously be used to display a code other than braille comprising a different number of relief points than six or a different geometric arrangement of the points.

Although the foregoing description and drawings relate to specific embodiments, it will be understood that various modifications may be made without departing from the scope and spirit of the invention, as defined in the appended claims.

We claim:

1. An electromechanical transducer device comprising:
   a bimorphous piezoelectric reed bendable around an axis perpendicular to the longitudinal axis of the reed on the application of a DC voltage;
   support means for each end of said reed;
   coupling means supported on said reed;
   a rod arranged transversely to said piezoelectric reed and coupled to said coupling means;
   and means for applying a DC voltage to said reed; whereby on the application of said voltage the bending of the reed causes static displacement of said rod in the direction of its own longitudinal axis.

2. An electromechanical transducer device according to claim 1, wherein said coupling means is symmetrically located midway between the two ends of the read.

3. A relief display device module comprising: a support housing including a tactually scanable plate having a plurality of holes therethrough arranged in an array; a plurality of electromechanical transducer devices housed in said housing, each electromechanical transducer device comprising a bimorphous piezoelectric reed bendable around an axis perpendicular to the longitudinal axis of the reed on the application of a d.c. voltage, support means for each end of said reed, coupling means supported on said reed, and a rod arranged tranversely to said piezoelectric reed and coupled to said coupling means, said rod having an end traversing slidably a respective, corresponding one of said holes between a first static position in which said rod end projects a tactually detectable distance from its hole and a second static position in which said rod end does not project from its hole, by the application of a d.c. voltage to said reed; and
   a printed circuit adapted to be held against said housing, bearing a plurality of electrical actuating circuits for the respective piezoelectric reeds.

4. A relief display device comprising a plurality of modules according to claim 3, assembled together in juxtaposition so that the scanable plates form a continuous planar surface.

5. A relief display device comprising:
a tactually scanable plate having a plurality of holes therethrough arranged in an array;
a plurality of rods having corresponding ends traversing slidably said holes;
a plurality of piezoelectric reeds arranged on one side of said plate;
means for supporting the ends of said reeds and means for electrical connection to the electrodes of said reeds;
rod-coupling means supported on each said reed and coupled to a rod to hold it perpendicular to a respective one of said reeds; each rod being movable along its longitudinal axis between a first static position in which its said end projects a tactually detectable distance from its hole and a second static position in which its said end does not project from its hole, by the application of a DC voltage to its respective reed.

6. Relief display device, comprising a reading plate having an array of holes arranged perpendicularly therethrough, an array of rods slidably arranged to project one end selectively through said holes, a plurality of multimorphous piezoelectric reeds, means coupling each reed to a respective rod, means connecting each piezoelectric reed to a source of electric voltage, means for controlling said voltage at one or the other of two distinct values as a function of an electrical control signal, and coding means supplying said electrical control signal whereby the piezoelectric reed bends in one direction or the other so as to cause the rods selectively to retract or project on the reading plate.

7. Device according to claim 3, wherein each said coupling means comprises adjusting means for the amount of said projection of the end of the rod beyond said hole.

8. Device according to claim 7, wherein said adjusting means comprises a threading on the rod and a tapping in the coupling means.

9. Device according to claims 3, wherein said rods are arranged in groups of six so that the ends of the rods form the conventional pattern of dots of a braille character.

10. Device according to claim 9, wherein said piezoelectric reeds are arranged between the aforesaid groups of rods and parallel to the reading plate and to the largest dimension of the braille character.

11. Device according to claim 1, including limiting means for the longitudinal axial movement of the rod, to avoid excessive external pressure on an end of the rod from bending the reed associated therewith beyond its breaking threshold.

12. Device according to claim 11, wherein said limiting means is consituted by a shoulder on the rod arrestable by the edge of an apertured element traversed by the end of the rod.

13. Device according to claim 1, wherein said support means for the ends of the reeds and said DC voltage applying means are constituted by metal spring strips fixed in notches, in an insulating housing.

14. A relief display device according to claim 3, including a metal touch switch adjacent to the scanable plate for changing or transferring the displayed data.

15. A pocket electronic computer comprising a relief display device according to claim 3.

16. An apparatus control panel comprising a braille keyboard and a display device according to claim 3.

17. In an information processing device, an electromechanical transducer according to claim 1.

18. A portable minicassette magnetic tape player/recorder comprising in combination: a braille keyboard; a tape transport unit; a control circuit and a relief display device which comprises:
a support housing including a tactually scanable plate having a plurality of holes therethrough arranged in an array; a plurality of electromechanical transducer devices housed in said housing, each electromechanical transducer device comprising a bimorphous piezoelectric reed bendable around an axis perpendicular to the longitudinal axis of the reed on the application of a d.c. voltage, support means for each end of said reed, coupling means supported on said reed, and a rod arranged transversely to said piezoelectric reed and coupled to said coupling means, said rod having an end traversing slidably a respective corresponding one of said holes between a first static position in which said rod end projects a tactually detectable distance from its hole and a second static position in which said rod end does not project from its hole, by the application of a d.c. voltage to said reed;
a printed circuit adapted to be held against said housing, bearing a plurality of electrical actuating circuits for the respective piezoelectric reeds; and
a metal touch switch adjacent to the scanable plate for changing or transferring the displayed data.

19. Device according to claim 13, wherein each end of the reed is slidably gripped between two of said metal spring strips.

20. Device according to claim 9, wherein said coupling means defines holes therein for the free passage of the rods adjacent to the coupled rod.

* * * * *